(12) United States Patent
Ross

(10) Patent No.: US 10,824,698 B2
(45) Date of Patent: Nov. 3, 2020

(54) MULTIMODE SMART CARD SYSTEM WITH EMBEDDED USB CONNECTIVITY

(71) Applicant: CardLogix, Irvine, CA (US)

(72) Inventor: Bruce Ross, Irvine, CA (US)

(73) Assignee: CARDLOGIX, Irvine, CA (US)

( * ) Notice: Subject to any disclaimer, the term of this patent is extended or adjusted under 35 U.S.C. 154(b) by 319 days.

(21) Appl. No.: 15/613,028

(22) Filed: Jun. 2, 2017

(65) Prior Publication Data
US 2017/0270399 A1  Sep. 21, 2017

Related U.S. Application Data

(63) Continuation-in-part of application No. PCT/US2015/063552, filed on Dec. 2, 2015, and a
(Continued)

(51) Int. Cl.
*G06F 21/12* (2013.01)
*G06K 19/077* (2006.01)
(Continued)

(52) U.S. Cl.
CPC ..... *G06F 21/123* (2013.01); *G06K 19/07722* (2013.01); *G06K 19/07743* (2013.01);
(Continued)

(58) Field of Classification Search
CPC ................... G06K 19/0772; G06K 19/07743
(Continued)

(56) References Cited

U.S. PATENT DOCUMENTS 6,735,695 B1    5/2004  Gopalakrishnan et al.
6,883,718 B1    4/2005  Le et al.
(Continued)

FOREIGN PATENT DOCUMENTS

WO   WO2010/041245   4/2010

OTHER PUBLICATIONS

Light et al., "An Efficient Wireless Communication Protocol for Secured Transmission of Content-sensitive Multimedia Data", World of Wireless, Mobile and Multimedia Networks&Workshops, 2009, WOWMOM 2009, IEEE International Symposium on A, Jun. 15, 2009, 3 pages, Piscataway, NJ.
(Continued)

*Primary Examiner* — Allyson N Trail
(74) *Attorney, Agent, or Firm* — Haynes and Boone, LLP

(57) ABSTRACT

Techniques are disclosed for systems and methods to conduct transactions using a Multi-mode Card. A Multi-mode Card may include various components of a Smart Card and be configured to interface directly with a personal electronic device (e.g., a smart phone, a tablet computer, a personal computer, and/or other personal electronic devices) to confirm presence of the Multi-mode Card in an unattended digital transaction, such as for e-commerce and Internet purchases. A transaction system may include a logic device and an interface embedded in or on the Card, a client device such as a personal electronic device, and a server configured to provide a sales interface to a user through the client device. The logic device in the Card may be configured to authorize, encrypt, and/or otherwise facilitate a transaction involving a sale and/or other type of communication between the client device and the server.

20 Claims, 4 Drawing Sheets

Related U.S. Application Data continuation-in-part of application No. 13/689,683, filed on Nov. 29, 2012.

(60) Provisional application No. 62/086,275, filed on Dec. 2, 2014, provisional application No. 61/564,588, filed on Nov. 29, 2011.

(51) Int. Cl.
  *G06Q 20/36* (2012.01)
  *H04L 29/06* (2006.01)
  *G06Q 20/38* (2012.01)
  *H04W 12/06* (2009.01)

(52) U.S. Cl.
  CPC ..... *G06Q 20/3674* (2013.01); *G06Q 20/3821* (2013.01); *H04L 63/0428* (2013.01); *H04L 63/0861* (2013.01); *H04W 12/0608* (2019.01); *H04L 63/0853* (2013.01); *H04L 63/0869* (2013.01); *H04L 63/166* (2013.01)

(58) Field of Classification Search
  USPC .......................................... 235/492
  See application file for complete search history.

(56) References Cited

U.S. PATENT DOCUMENTS

| | | | |
|---|---|---|---|
| 2002/0027992 | A1 | 3/2002 | Matsuyama et al. |
| 2002/0029340 | A1 | 3/2002 | Pensak et al. |
| 2003/0046237 | A1 | 3/2003 | Uberti |
| 2005/0240689 | A1* | 10/2005 | Learning ............... G06F 13/385 710/52 |
| 2008/0097924 | A1 | 4/2008 | Carper et al. |
| 2008/0179401 | A1 | 7/2008 | Hart et al. |
| 2008/0235779 | A1 | 9/2008 | Bogner |
| 2009/0280865 | A1* | 11/2009 | Danis ................... H04B 1/3816 455/558 |
| 2010/0142161 | A1 | 6/2010 | Garnier |
| 2010/0181380 | A1* | 7/2010 | Trotter ................. G06K 19/077 235/488 |
| 2011/0010470 | A1* | 1/2011 | Hulbert ................. G06F 3/0219 710/13 |
| 2011/0138450 | A1 | 6/2011 | Kesanupalli et al. |
| 2011/0256832 | A1* | 10/2011 | Park ....................... H04B 5/0056 455/41.2 |
| 2014/0094054 | A1* | 4/2014 | Dentzel ................. H01R 13/72 439/501 |
| 2015/0348011 | A1* | 12/2015 | Li ........................ G06Q 20/341 705/41 |
| 2017/0196327 | A1* | 7/2017 | Ma ......................... A45C 11/00 |

OTHER PUBLICATIONS

International Search Report, International Patent Application No. PCT/US2012/067141, dated Mar. 5, 2013, 4 pages.

European Office Action, European Patent Application No. 12808961.2, dated Feb. 3, 2017, 7 pages.

International Search Report, International Patent Application No. PCT/US2015/063552, dated Mar. 16, 2016, 3 pages.

\* cited by examiner

MULTIMODE SMART CARD SYSTEM WITH EMBEDDED USB CONNECTIVITY

CROSS-REFERENCE TO RELATED APPLICATIONS

This application is a continuation-in-part of International Patent Application No. PCT/US2015/063552 filed Dec. 2, 2015 and entitled "MULTIMODE SMART CARD SYSTEM WITH EMBEDDED USB CONNECTIVITY", which claims priority to and the benefit of U.S. Provisional Patent Application No. 62/086,275 filed Dec. 2, 2014 and entitled "MULTIMODE SMART CARD SYSTEM WITH EMBEDDED USB (UNIVERSAL SERIAL PORT) CONNECTIVITY", which are all hereby incorporated by reference in their entirety.

This application is also a continuation-in-part of U.S. patent application Ser. No. 13/689,683 filed Nov. 29, 2012 and entitled "LAYERED SECURITY FOR AGE VERIFICATION AND TRANSACTION AUTHORIZATION", which claims priority to and the benefit of U.S. Provisional Patent Application No. 61/564,588 filed Nov. 29, 2011 and entitled "LAYERED SECURITY SYSTEM FOR AGE VERIFICATION AND AUTHORIZING TRANSACTIONS USING SPECIALLY FORMATTED SMART CARDS", which are all hereby incorporated by reference in their entirety.

TECHNICAL FIELD

One or more embodiments of the invention relate generally to smart card systems and more particularly, for example, to systems and methods for facilitating transactions using smart cards.

BACKGROUND

Smart card technology is increasingly used for retail, e-commerce and enterprise data security applications. Smart cards are improving upon the traditional magnetic stripe currently in use on many plastic cards. The smart card can act as a miniature PC with its own processor/memory architecture, using an operating system on which applications are executed, or it can be a secure storage device that limits access to its contents by its on board logic.

SUMMARY

Techniques are disclosed for systems and methods to conduct transactions using a Multi-mode Card. In one embodiment, a Multi-mode Card may include various components of a Smart Card that may be configured to interface directly with a personal electronic device (e.g., a smart phone, a tablet computer, a personal computer, and/or other personal electronic devices) to confirm presence of the Multi-mode Card in an unattended digital transaction, such as for e-commerce and Internet purchases. A transaction system may include a logic device and an interface embedded in or on the Card, a client device such as a personal electronic device, and a server configured to provide a sales interface to a user through the client device. The logic device in the Card may be configured to authorize, encrypt, and/or otherwise facilitate a transaction involving a sale and/or other type of communication between the client device and the server. The interface may be adapted physically couple to and/or otherwise facilitate direct communication between the Card and the client device, for example, and/or between the Card and the server.

In one embodiment, a multi-mode card comprises one or more of a substantially plastic support layer, a circuitry layer, a microprocessor, a contact and/or contactless interface, and/or a visible design layer. The contact and/or contactless interface may be implemented according to the radio frequency identification (RFID), near field communication (NFC), Bluetooth low energy (BTLE), universal serial bus (USB), FireWire, and/or other wired and/or wireless protocols and/or interfaces. The contact and/or contactless interface may be configured to facilitate data communication between the microprocessor and a personal electronic device. The microprocessor and the interface may be embedded within and/or formed from the materials used to form the support layer, the circuitry layer, the design layer, and/or the multi-mode card.

In another embodiment, a method includes communicating card data and or value by means of a specialized smart card and embedded microprocessor chip that has multiple methods of interfacing. Such methods of interfacing may include Contact, Contactless, USB, and/or other interface variations.

In another embodiment, a transaction system includes a multi-mode card that meets one or more normal ISO dimensional standards for Contact and/or Contactless industry-standard card bodies, including ID-1 CR80, ISO 7810, ISO7816-1, 2 and 3; and a built in physical USB interface conforming to the electrical standards of USB 1, 2, 3 and future iterations, wherein all card body standards are met with the exception of one card corner which is modified to accommodate circuitry that connects externally to a USB port/connector and/or a dual port converter. The multi-mode card may include a multi-mode card/chip operating system configured to recognize the card/reader interface being used and operate/communicate accordingly. The transaction system may include a compact two sided connector or port converter for inserting a multi-mode card into a USB port for a personal electronic device that communicates USB signals according to the correct version/form factor of USB for the USB port.

In another embodiment, a method of multi-mode card assembly includes exposing partial circuitry or fingers of the multi-mode card that include electrical data connections for the USB interface. The assembly may be achieved by having an interlayer of the multi-mode card that carries the electrical data connections/circuitry exposed by a methodology that enables a partial cutting or removal of top layers of the multi-mode card. An area that will be exposed after final assembly may have a material selectively applied on its top surface that stops the lamination that occurs in card manufacturing thereby enabling the exposed area to be lifted after cutting.

In another embodiment, a multi-mode card may be configured to, when inserted into a USB port, behave both as a smart card reader/writer and as a smart card or token. Such multi-mode card may include a microprocessor of the multi-mode card and a multi-mode card operating system that work in conjunction to pass data according to the correct formats and responses expected by the USB port. The multi-mode card may be implemented according to a multi-mode card system architecture including a smart card chip connected to circuitry via connections to a bottom of the smart card module or to a chip carrier of the microprocessor if there is no other contact to the chip. Such architecture may include custom tooling to use the same or similar types of connections used in dual interface smart cards.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the invention and their advantages are best understood by referring to the detailed description that follows. It should be appreciated that like reference numerals are used to identify like elements illustrated in one or more of the figures.

DETAILED DESCRIPTION

This solution addresses the need for confirming that a card is present in an unattended digital transaction, such as for e-commerce and Internet purchases. In addition to the security of the smart card software, USB connectivity has been incorporated into the design of the card's chip and the card's physical design. This connectivity, or interface, can be one of three choices, depending on the selection of card reader: Contact, Contactless, or USB, for example. The addition of a USB interface provides a simple, low-cost solution for direct connection to a computing device via a USB port. The card system can include a supplied two sided port converter that communicates the USB signals to the correct version/form factor of USB.

Card Present Transactions

Technology has gradually addressed the need to confirm a cardholder identity when a digital transaction is done. However, there is still no highly secure convenient and reliable way to identify the cardholder and the card together, to prevent unauthorized use by someone else. This problem has been especially problematic in the Financial Card industry, as cardholders can deny an online purchase, creating costly chargebacks for the card issuer. With face-to-face transactions and purchases, smart and/or mag-stripe cards are either swiped through a contact reader or waived on a contactless reader. The present solution is uniquely versatile, working with all three interfaces, in any type of transaction environment.

This solution is also ideal for non-financial applications, such as Healthcare visits, to authenticate patient visits with providers, and streamline care and insurance claims. The addition of a USB port also enables faster secure data transfers of large data files and used in health informatics environments.

Solution Components

1. An industry-standard card body: CR80, 78-10, 16, and ID-1.
2. A microprocessor chip, powered by magnetic induction and/or a wired connection (e.g., USB).
3. An enhanced chip/Card Operating System, capable of recognizing the reader interface being used and operating accordingly.
4. A supplied two sided port converter that communicates the USB signals to the correct version/form factor of USB.
5. A connector for inserting the card into a computer's USB port.
6. Compatibility with all industry standard contact (ISO7816) and contactless (ISO14443) smart card readers.
7. A local memory accessible by the microprocessor chip.

Figure 1:
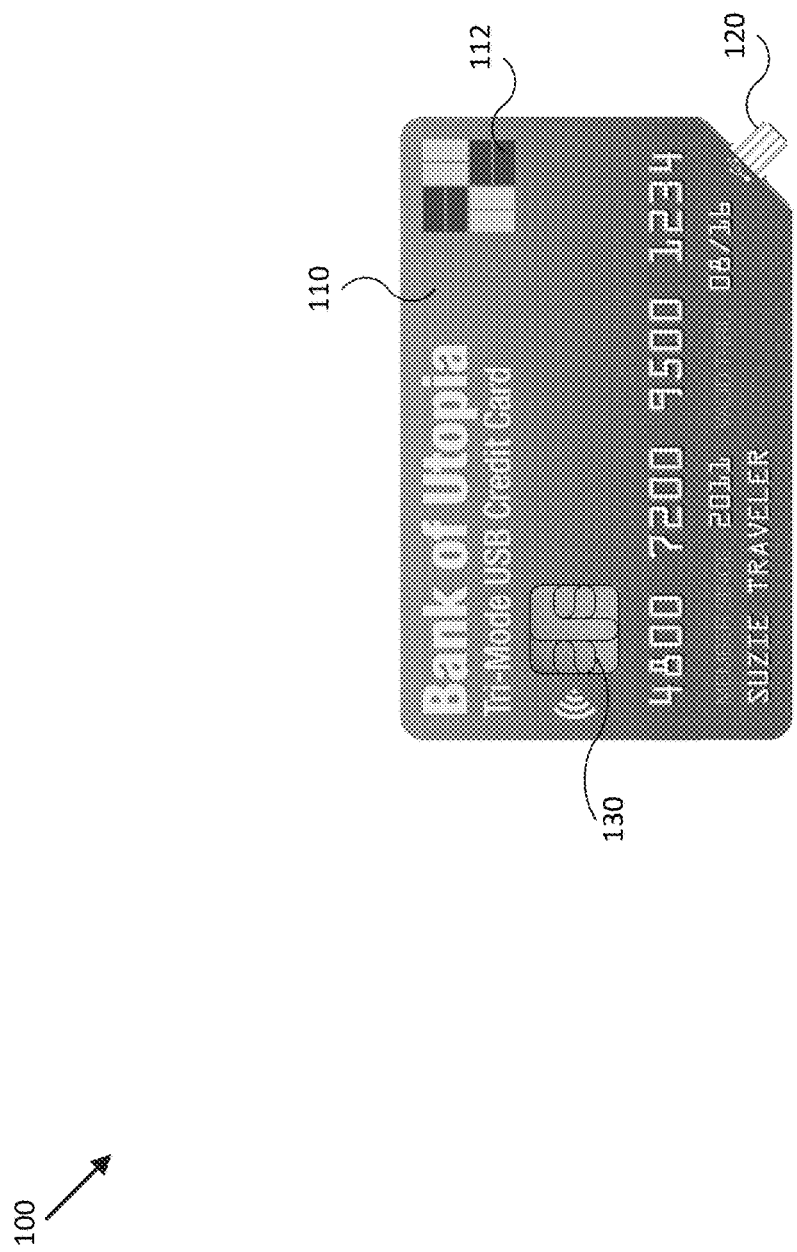
FIG. 1 illustrates an example of a Multi-mode Card in accordance with an embodiment of the disclosure.

FIG. 1 illustrates an example of a Multi-mode Card 100 in accordance with an embodiment of the disclosure. In the embodiment shown in FIG. 1. Multi-mode Card 100 includes support layer 110, design layer 112, USB interface 120, and microprocessor contacts 130. The microprocessor under contacts 130 may interface with a personal electronic device using USB interface 120 and/or contacts 130, for example, but the contacts typically require a physical card reader and separate drivers, whereas USB interface 120 does not require a physical card reader separate from card 100, and card 100 may be configured to provide an appropriate driver over USB interface 120.

Figure 2:
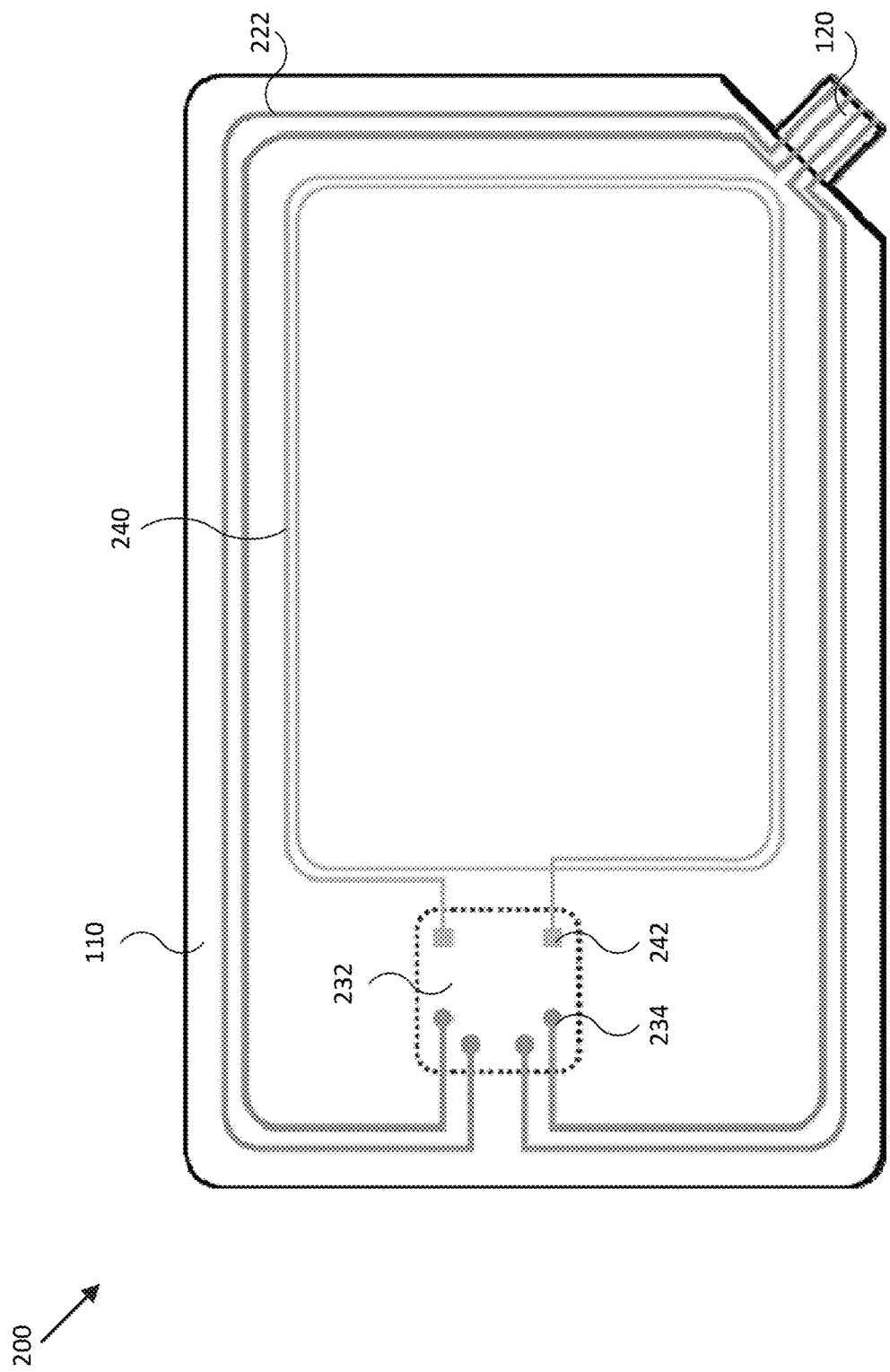
FIG. 2 illustrates an example of the internal layers of a Multi-mode Card in accordance with an embodiment of the disclosure.

FIG. 2 illustrates an example of the internal layers of a Multi-mode Card 200 in accordance with an embodiment of the disclosure. In the embodiment shown in FIG. 2, Multi-mode Card 200 includes support layer 110, USB interface 120, USB interface circuitry layer 222 including contacts 234 to microprocessor 232 (shown in outline), and wireless interface circuitry layer 240 including contacts 242 to microprocessor 232. As shown, card 200 may be configured to communicate with a personal electronic device using either or both of wireless interface circuitry layer 240 (e.g., using an inductive interface as shown) and USB interface 120.

Figure 3:
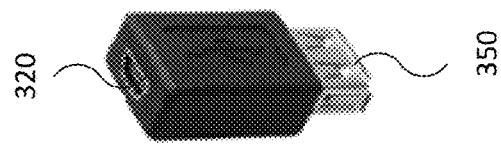
FIG. 3 illustrates an example of a two sided port converter in accordance with an embodiment of the disclosure.
Figure 3:
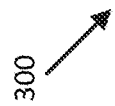

FIG. 3 illustrates an example of a two sided port converter 300 in accordance with an embodiment of the disclosure. In the embodiment shown in FIG. 3, port converter 300 includes first side card USB interface 320 and second side computer USB interface 350. In other embodiments, second side interface 350 may be implemented according to different wired interfaces, such as Firewire, Lightning, and/or other wired interfaces to personal electronic devices.

Figure 4:
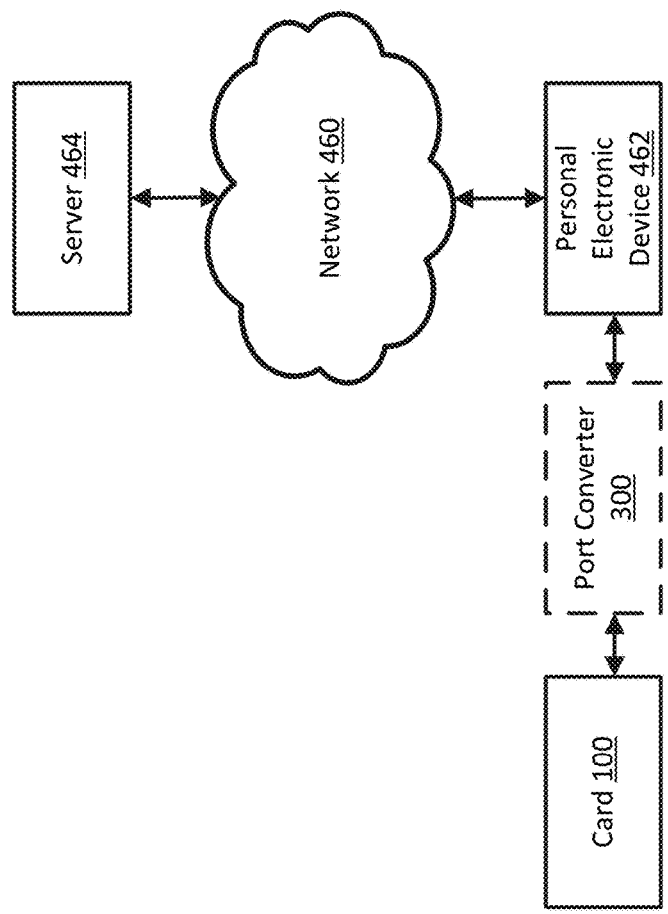
FIG. 4 illustrates an example of a transaction system utilizing a multi-mode card in accordance with an embodiment of the disclosure.

FIG. 4 illustrates an example of a transaction system 400 utilizing a multi-mode card in accordance with an embodiment of the disclosure. In the embodiment shown in FIG. 4, transaction system 400 includes personal electronic device 462 attempting to transact with server 464 over network 460. Network 460 may be a WAN (e.g., a cellular network, the Internet), one or more LANs (e.g., a WiFi, Bluetooth, and/or other wireless or wired local area networks), or a combination of both. Server 464 may be configured to provide a sales and/or other user interface to a user of personal electronic device 462. Personal electronic device 462 may be a smart phone, tablet computer, personal computer, and/or other personal electronic device configured to transact with server 464 and able to interface with card 100 (e.g., implemented similarly to card 100 in FIG. 1 and/or card 200 in FIG. 2). Optionally, system 400 may include port converter 300 configured to, for example, convert a USB interface of card 100 to a USB interface of personal electronic device 462. System 400 may be configured to implement any of the methods described herein.

Smart card technology is increasingly used for retail, e-commerce and enterprise data security applications. Smart cards are improving upon the traditional magnetic stripe currently in use on many plastic cards. The smart card can act as a miniature PC with its own processor/memory architecture, using an operating system on which applications are executed, or it can be a secure storage device that limits access to its contents by its on board logic.

The world is converting to the next-generation EMV credit card that combines smart card technology with existing magnetic stripes. In the United States, smart cards are currently in use in self-contained communities, such as college campuses and enterprise and government offices. The U.S. government uses smart card technology to secure the infrastructure surrounding the deployment of military forces.

Colleges, universities, and the medical and healthcare industry are driving the wide-scale deployment of multi-application smart cards. These enterprises are integrating user identification capabilities and moving into other value-added applications. The industry group ICMA estimates that 1.65 billion smart cards will be deployed by 2015.

Smart cards and transaction systems using these cards have been around for many years. In all of these systems the applications that utilize them are built to recognize and authorize cards either through a common on-line network such as the France Telecom network or any of the GSM phone systems used today. In the larger banking systems and stored value systems deployed today such as the EMV platform/Common Electronic Purse Standard or others, smart cards all are authenticated through a common network or the value exchange is through dedicated loaded applications.

In many systems cards can be authenticated off-line by a dedicated application. The authentication application is often uploaded to terminals or resides on an additional type of smart card called a Secure Access Module or "SAM". The oldest deployed system is VISA cash and Mondex; both systems employ SAMs. In these systems the first application receives the data from a card and requests authentication from the SAM. Another method is to dedicate the entire application and system to a card type, this type of system is common to many of the laundry and parking meter systems using smart cards today.

Enterprise Data Security

In the past, network security was primarily the concern of enterprises engaged in security sensitive industries. Banks and financial institutions generally used some form of security technology, such as encryption to protect customer transactions such as inter-bank transfers. Increasingly, however, financial institutions and businesses are extending the services across the Internet and are implementing additional security measures adapted to the Internet infrastructure.

The development of electronic commerce, and extranet and Intranet applications, has substantially increased network complexity for all users. The risk of network fraud and the challenge of maintaining online confidentially have increased at an astronomic pace. Unauthorized intrusions, falsifications, and damage on computer networks are extremely costly. Individuals and business increasingly rely upon computer networks, including the Internet, to communicate, access information, and conduct commerce. Businesses are now employing local area networks to connect computer users located in a single facility and wide area networks to connect to customers in remotely. This online business environment has different security requirements than traditional environments. Enterprise networks are no longer defined by the physical boundaries of a business location but often encompass remote sites and include mobile users and telecommuters around the world. These changes introduce additional security concerns because of the increased use of remote access and extranets and the reliance on shared public networks such as the Internet. Security requirements have become much more complex.

The Internet significantly influences business operations, from the distribution of information to business logistics, from consumer retailing to entertainment, and from banking and finance to customer service. The migration towards Internet-dependent business models is occurring at a rapid pace and is changing the nature of how enterprises conduct business. Disparate transaction systems are common in today's retail environments even among the same company. Businesses are trying to develop strategies to manage the complexities brought on by growth and the opportunities made possible by the Internet.

Authentication is Necessary for Data Security

Smart card security today requires products that are focused in enterprise information technology. Experts from government and industry organizations have standardized the classification of data security as follows:
ACCESS CONTROL manages access rights to sensitive information and is a basic feature of operating system platforms and file systems.
CONFIDENTIALITY involves the encryption of data transmissions so that only the intended recipient can access the information.
DATA INTEGRITY ensures that data is not compromised or manipulated.
NON-REPUDIATION provides undeniable proof that transactions, once committed, are valid, binding, and irrevocable.
AUTHENTICATION proves the identity of users and systems on the network.

Authentication is a critical component of access control, confidentiality, data integrity and non-repudiation. To provide access to the network or to sensitive information, the network must be able to identify the user accurately. Business systems, services and applications currently authenticate users with a variety of digital credentials, including passwords and digital signatures and smart cards.

Public Key Infrastructure (PKI) is the leading technology for network security, including access control to information from web browsers, secure e-mail, signing digital forms, firewalls, routers supporting VPNs and directories. PKI employs a public-private key pair rather than solely a secret key to encrypt and decrypt data and generate digital signatures and certificates.

Digital certificates are secure data files containing a user's public key along with other user identification information. The public key is made available to anyone who wants it, but only its owner holds the corresponding private key. Senders use the public key to encrypt data to be sent to a user, and the user then decrypts the data by employing the corresponding private key. Smart cards are the safest place to store and manage an individual's digital certificate and key pairs.

In most high value transactional environments deploying smart cards today, the card is a microprocessor based device that can independently generate a key that is the starting point for a transaction session. The card and the system mutually authenticate each other and a session key is generated and used for that particular transaction.

Other verification and/or transaction authentication methodologies are contemplated, such as those described in International Patent Application PCT/US2012/067141 filed Nov. 29, 2012 and entitled "LAYERED SECURITY FOR AGE VERIFICATION AND TRANSACTION AUTHORIZATION," which is hereby incorporated by reference in its entirety. Such methodologies may be implemented using a multi-mode card and/or system as described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A multi-mode card, comprising:
   a support layer;
   a design layer disposed over at least a portion of the support layer;
   a universal serial bus (USB) interface comprising a first circuitry layer formed within the support layer and the design layer and configured to support communication with a personal electronic device;
   a contact interface configured to support communication with the personal electronic device;
   a contactless interface comprising a second circuitry layer disposed on the support layer and formed within the first circuitry layer and configured to provide an inductive interface to the personal electronic device; and
   a microprocessor embedded within the support layer and the design layer and electrically coupled to the USB interface, the contact interface, and the contactless interface, wherein the contact interface is electrically coupled to the first circuitry layer and to the second circuitry layer using a plurality of contacts disposed on the microprocessor.

2. The multi-mode card of claim 1, wherein the contact interface and/or the contactless interface are configured to interface with a smart card reader, and
   wherein the microprocessor is configured to:
   determine that the USB interface, the contact interface, and/or the contactless interface is being used and to communicate with the personal electronic device and/or the smart card reader over the appropriate interface.

3. The multi-mode card of claim 1, wherein:
   the support layer and/or the design layer are formed substantially according to one or more card body dimensional standards selected from the group consisting of ID-1, CR80, ISO 7810, ISO7816-1, ISO7816-2, and/or ISO7816-3;
   the support layer and/or the design layer are modified relative to the one or more card body dimensional standards to accommodate circuitry and/or a shape that is configured to connect to an external USB port or connector and/or to a dual port converter; and
   the USB interface conforms to the electrical standards of USB 1, USB 2, USB 3, and/or any other USB standard.

4. The multi-mode card of claim 1, wherein the microprocessor is configured to:
   determine that the USB interface is coupled to the personal electronic device; and
   provide a USB driver to the personal electronic device over the USB interface.

5. The multi-mode card of claim 1,
   wherein the second circuitry layer is configured to provide power to the microprocessor through the inductive interface and the first circuitry layer is configured to provide power to the microprocessor through a wired interface with the USB interface.

6. A transaction system comprising the multi-mode card of claim 1, further comprising:
   a port converter comprising first and second interfaces, wherein the first interface is configured to couple to the USB interface of the multi-mode card and the second interface is configured to couple to the personal electronic device to enable communication between the microprocessor of the multi-mode card and the personal electronic device.

7. The transaction system of claim 6, wherein the port converter is configured to communicate signals according to the correct version/form factor for the first and second interfaces.

8. The transaction system of claim 6, further comprising the personal electronic device, wherein:
   the personal electronic device comprises a smart phone or a tablet computer; and
   the second interface of the port converter comprises a Firewire or Lightning interface.

9. The transaction system of claim 8, wherein:
   the microprocessor is configured to provide a driver for the second interface of the port converter to the personal electronic device; and
   the microprocessor is configured to present a secure storage device accessible by the personal electronic device over the second interface of the port converter.

10. The multi-mode card of claim 1, wherein the microprocessor is configured to:
    communicate card data and/or values to the personal electronic device over the USB interface, the contact interface, or the contactless interface.

11. A method of assembling the multi-mode card of claim 1, comprising:
    exposing circuitry or fingers disposed within or on the support layer that comprise electrical data connections of the USB interface.

12. The method of claim 11, wherein the exposing comprises partial cutting of the support layer and/or the design layer of the multi-mode card.

13. The method of claim 12, further comprising:
selectively applying a material to an area of the support layer that will be exposed after final assembly, wherein the material is configured to block lamination formation of the multi-mode card in the area to enable the exposed area to be lifted after the partial cutting.

14. The multi-mode card of claim 1, wherein the microprocessor is configured to cause the multi-mode card to act as a smart card reader/writer and as a smart card or token when the USB interface is coupled to an external USB port.

15. The multi-mode card of claim 14, wherein the microprocessor is configured to pass data according to the correct formats and responses expected by the external USB port.

16. A system architecture for the multi-mode card of claim 1, wherein the system architecture comprises a smart card chip connected to circuitry via connections to a bottom of the smart card chip or to a chip carrier of the microprocessor.

17. The system architecture of claim 16, further comprising tooling of the support layer and/or the design layer to form the USB interface, the contact interface, and/or the contactless interface.

18. The system architecture of claim 16, wherein the smart card chip is configured to provide a secure storage device assessible by the personal electronic device.

19. The multi-mode card of claim 1, further comprising a local memory embedded within the support layer and/or the design layer and electrically coupled to the microprocessor.

20. The multi-mode card of claim 1, wherein the microprocessor is configured to:
provide a driver to the personal electronic device over the USB interface.

* * * * *